(12) United States Patent
Heinzl (10) Patent No.: US 11,021,121 B2
(45) Date of Patent: Jun. 1, 2021

(54) DEFORMABLE ELEMENT

(71) Applicant: Siemens AG ÖSTERREICH, Vienna (AT)

(72) Inventor: Philipp Heinzl, Enzenreith (AT)

(73) Assignee: SIEMENS MOBILITY AUSTRIA GMBH, Vienna (AT)

( * ) Notice: Subject to any disclaimer, the term of this patent is extended or adjusted under 35 U.S.C. 154(b) by 0 days.

(21) Appl. No.: 15/533,590

(22) PCT Filed: Nov. 25, 2015

(86) PCT No.: PCT/EP2015/077597
§ 371 (c)(1),
(2) Date: Sep. 26, 2017

(87) PCT Pub. No.: WO2016/091586
PCT Pub. Date: Jun. 16, 2016

(65) Prior Publication Data
US 2018/0162304 A1    Jun. 14, 2018

(30) Foreign Application Priority Data
Dec. 11, 2014 (AT) .............................. A 50898/2014

(51) Int. Cl.
| | |
|---|---|
| *F16F 7/12* | (2006.01) |
| *B60R 19/34* | (2006.01) |
| *B61G 11/16* | (2006.01) |
| *B62D 21/15* | (2006.01) |
| *B61D 15/06* | (2006.01) |
| *B60R 19/03* | (2006.01) |

(52) U.S. Cl.
CPC .............. *B60R 19/34* (2013.01); *B60R 19/03* (2013.01); *B61D 15/06* (2013.01); *B61G 11/16* (2013.01); *B62D 21/15* (2013.01); *F16F 7/123* (2013.01)

(58) Field of Classification Search
CPC . B60R 19/18; B60R 19/34; B60R 2019/1806; B60R 2019/1813; B60R 2019/186; F16F 7/12; F16F 7/123; B61D 15/06; B61D 21/15; B61G 11/16
USPC ........................................ 188/371, 376, 377
See application file for complete search history.

(56) References Cited

U.S. PATENT DOCUMENTS 1,424,359 A * 8/1922 Isgrig ...................... B60R 19/18
213/220
3,307,868 A * 3/1967 Blank ..................... B60R 19/34
188/371
(Continued)

FOREIGN PATENT DOCUMENTS

| DE | 4302878 A1 | 8/1993 |
|---|---|---|
| DE | 29722844 U1 | 4/1999 |

(Continued)

OTHER PUBLICATIONS

Office Action dated Feb. 6, 2019 issued in Canadian Patent Application No. 2,967,915.

*Primary Examiner* — Thomas J Williams
(74) *Attorney, Agent, or Firm* — Cozen O'Connor (57) ABSTRACT

A deformable element includes a profiled tube having a rectangular cross-section, and a plate which closes the profiled tube at one end, where a bracket is fastened between opposite sides of the profiled tube at the end of the profiled tube that is closed by the plate.

9 Claims, 6 Drawing Sheets

(56) References Cited

U.S. PATENT DOCUMENTS

| | | | | |
|---|---|---|---|---|
| 3,782,769 | A * | 1/1974 | Fader | B60R 19/36 188/314 |
| 4,190,276 | A * | 2/1980 | Hirano | B60R 19/34 188/376 |
| 4,272,114 | A * | 6/1981 | Hirano | F16F 7/12 188/377 |
| 7,631,924 | B2 * | 12/2009 | Nilsson | B60R 19/34 296/133 |
| 9,193,319 | B2 * | 11/2015 | Kutscher | B60R 19/18 |
| 2005/0211520 | A1 | 9/2005 | Abu-Odeh et al. | |
| 2008/0030031 | A1 | 2/2008 | Nilsson | |
| 2014/0070554 | A1 * | 3/2014 | Kutscher | F16F 7/12 293/122 |
| 2014/0174867 | A1 | 6/2014 | Hirose | |
| 2014/0191532 | A1 | 7/2014 | Hirose | |
| 2015/0061307 | A1 * | 3/2015 | Nakanishi | B60R 19/34 293/133 |

FOREIGN PATENT DOCUMENTS

| | | | | |
|---|---|---|---|---|
| DE | 102005051621 | A1 | 5/2007 | |
| DE | 102013217990 | A1 | 3/2015 | |
| EP | 2236380 | A1 | 10/2010 | |
| EP | 2786903 | A1 | 10/2014 | |
| WO | WO-2012110208 | A1 * | 8/2012 | F16F 7/12 |
| WO | WO-2013150671 | A1 * | 10/2013 | B60R 19/34 |

* cited by examiner

DEFORMABLE ELEMENT

CROSS-REFERENCE TO RELATED APPLICATIONS

This is a U.S. national stage of application No. PCT/EP2015/077597 filed 25 Nov. 2015.

This application claims the priority of Australian application No. A50898/2014 filed Dec. 11, 2014, the content of which is incorporated herein by reference in its entirety.

BACKGROUND OF THE INVENTION

1. Field of the Invention

The invention relates to safety devices and, more particularly, to a deformable element.

2. Description of the Related Art

Deformable elements which, in the course of a deformation process irreversibly convert the kinetic energy of the impact into deformation and thermal energy, are used to absorb kinetic energy in the event of collisions between vehicles, in particular passenger vehicles. As a result, force peaks that occur in a pulsed manner on the vehicle and consequently on the passengers can be reduced and maintained by a localized and controlled degradation of energy in the survival space of the passengers. In motor vehicles, these deformable elements are in most cases formed as part of the support structure. In railed vehicles, a discrete structure as a separately producible deformable element is also customary. These deformable elements, also component groups referred to as crash modules, deformable modules, yielding elements or energy absorption elements, can be produced based on various technologies. For instance, deformable elements made of metal foams or tubular deformable elements that are expanded for energy absorption are customary. One functional principle that is used very frequently is based on the progressive folding of rectangular tubes. Such deformable elements can be produced very easily and inexpensively and have both a highly predictable energy absorption capacity and also a force level that is easily ascertainable for the deformation. Nevertheless, a significantly higher force is required for the start of the deformation process than for the further deformation process which, in accordance with the prior art, can be prevented by the specific attenuation of the tubular energy absorber. To this end, the tubular energy absorber can be provided with slots, boreholes, i.e., specific attenuations, which benefit the embodiment of a first fold. These measures require an additional, to some extent high production outlay and prevent the production of closed and, thus, water-tight deformable elements. The use of deformable elements on railed vehicles in particular often requires water-tight deformable elements, otherwise these can only be protected from corrosion at extreme costs or have to be produced from significantly more expensive stainless steel.

SUMMARY OF THE INVENTION

In view of the foregoing, it is therefore an object of the invention to provide a deformable element, which has a very low force peak at the start of the deformation process, which can be produced very inexpensively and which can, in such cases, be configured to be water-tight.

These and other objects and advantages are achieved in accordance with the invention by a deformable element having a deformable element comprising a profiled tube with a rectangular cross-section and a plate that closes the profiled tube at one end is described, where a bracket is fastened between opposite sides of the profiled tube at the end of the profiled tube that is closed by the plate.

As a result, an initial deformation of the profiled tube in the case of an axial strike from a collision object is advantageously ensured, as a result of which the further deformation of the profiled tube is performed with the force level determined from the respective geometry and the material properties. The force peak otherwise occurring in the longitudinal direction with the deformation of profiled tubes on account of compressive forces is largely omitted because, in the course of the deformation process and on account of its shaping, the bracket firstly strikes the plate and deforms the same. As a result, an initial deformation of the walls of the profiled tube is initiated. The special shaping of the bracket gives rise to a tubular formation that corresponds to the natural bulge pattern of a profiled tube with a rectangular cross-section, i.e., two opposite tubular surfaces bulge outwards, the other two bulge inwards, where this bulge pattern continues alternately.

The bracket is preferably manufactured from sheet metal and in accordance with one embodiment is formed such that in its path from one fastening point to the next, it first has a convex section, followed by a concave section, followed by a convex section. When viewed from the profiled tube in the direction of an axial collision opponent, this can be seen to be convex and concave. The bracket is to be shaped such that in the event of a crash, the concave section is the first to touch the plate and in doing so impresses the same. The further forced deformation of the bracket here effects a deformation of the side walls of the profiled tube, so that the otherwise unavoidable force peak is omitted for the further deformation. The bracket acts as a tripping device for a progressive folding of the profiled tube. This further folding of the profiled tube occurs after a complete deformation and flattening of the bracket in accordance with the natural bulge pattern.

In accordance with a further advantageous embodiment, the bracket has a substantially U-shaped course. In such cases, in a first section, the bracket represents an extension of the opposite side walls of the hollow tube on both sides, which are connected by a curved section. This embodiment that is simplified in comparison to a double s-shaped bracket is deformed in the course of the deformation process in the first phases such that an s-shaped course of the bracket is also developed. In the further phases, a deformable element with a U-shaped bracket behaves practically identically to a deformable element with a double s-shaped bracket. A slightly delayed response from the deformable element is to be expected, however, on account of the increased idle travel up to the deformation of the hollow tube in the case of a U-shaped bracket. Moreover, a deformable element with a double s-shaped bracket provides more parameters for calibrating the deformation behavior, but a higher outlay is to be expected for the production of the double s-shaped bracket.

The profiled tube is to be formed as a closed rectangular hollow tube, where a square cross-section can also be used.

The specific form of a deformable element in accordance with disclosed embodiments is implemented with consideration given to the expected energy to be absorbed and the installation space available. In such cases, the wall thicknesses, the shape and the material are typically defined within the framework of a computer simulation.

It is particularly advantageous to select weldable material combinations for the profiled tube, the plate and the bracket, because in such cases a very simple connection can be established between these components and a water-tight deformable element can be produced with a correspondingly formed weld of the plate to the profiled tube.

The deformable element can be fastened to a support structure, typically a body of a vehicle, in accordance with the requirements of use. In such cases, welding is also advantageous if the water tightness also has to be ensured. As an alternative to this, the deformable element can be detachably fastened, such as using a base plate and a screw connection.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

These and other aspects and advantages will become more apparent and more readily appreciated from the following description of the exemplary embodiments, taken in conjunction with the accompanying drawings, in which.

DETAILED DESCRIPTION OF THE EXEMPLARY EMBODIMENTS

Figure 1:
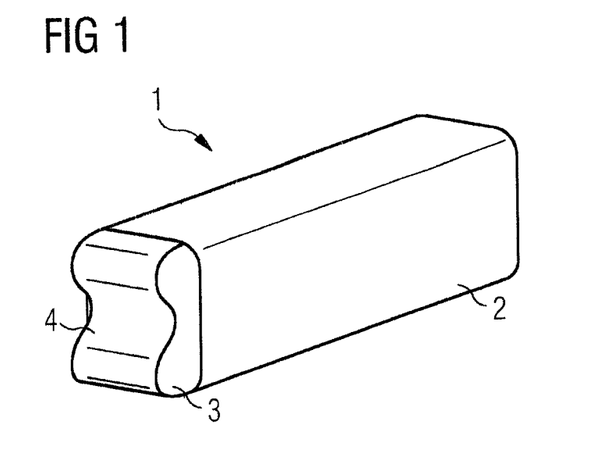
FIG. 1 is an illustration of a deformable element in accordance with the invention.

FIG. 1 shows by way of example and schematically a deformable element 1, which comprises a profiled tube 2 and which is closed on one side by a plate 3. This plate 3 is arranged at the end of the profiled tube 2 at which the collision opponent strikes in case of a crash. In the exemplary illustrated embodiment, the profiled tube 2 is formed with a square cross-section. The side of the profiled tube 2 that is closed with the plate 3 is also equipped with a bracket 4. The bracket 4 is formed from sheet metal and extends between opposite sides of the profiled tube 2. The bracket 4 is firmly connected, typically welded, to the profiled tube 2 at the connecting points. The bracket 4 follows a repeatedly curved shape which is formed in a double s-shape. In such cases, the course between the fastening points on the profiled tube is provided as a sequence of a convex section, followed by a concave section, followed by a further convex section. This sequence is clearly visible in FIG. 2. At its end facing away from the bracket 4, the profiled tube 2 is formed to fasten to a support component 5. Such a fastening option is not shown in further detail in FIG. 1.

Figure 2:
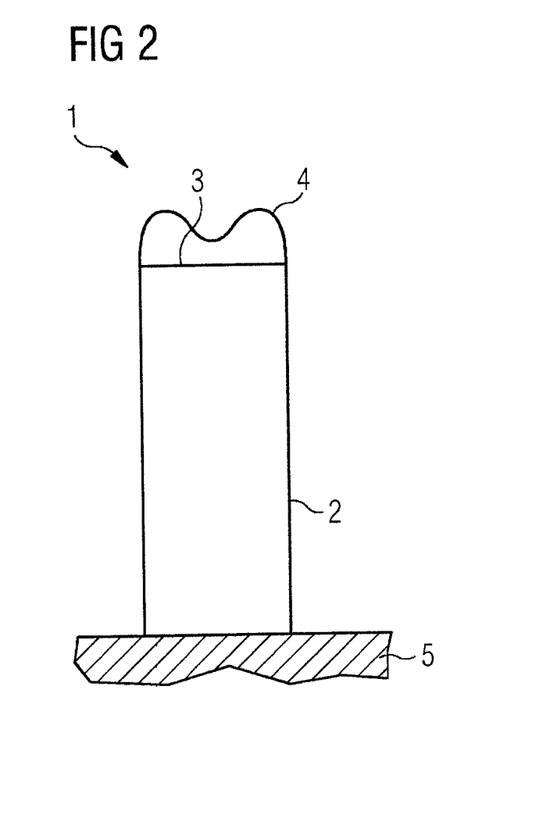
FIG. 2 in illustration of a side view of the deformable element of FIG. 1.

FIG. 2 shows by way of example and schematically a side view of a deformable element. The deformable element 1 from FIG. 2 is shown in a side view in which the shaping of the bracket 4 can be seen especially clearly. The S-shaped course of the shape of the bracket 4 begins on both sides at each fastening point with the profiled tube 2 with a forwardly arched convex section. A rearwardly arched concave section is arranged between the two convex sections. The peak (i.e., the maximum) of the concave section that faces the plate 3 does not touch the plate 3 but, instead, forms a specific distance from the plate 3.

Moreover, a support component 5 is shown, to which the deformable element 1 is fastened. The deformable element 1 is oriented such that a crash occurs in the direction of the bracket 4, the terms forward and backward relate hereto. FIGS. 3 to 8 indicate the deformation of a deformable element in a computer simulation.

Figure 3:
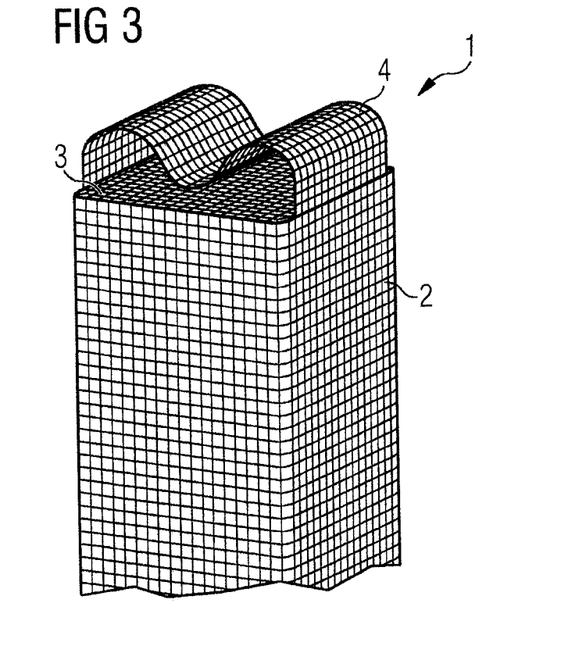
FIG. 3 is an illustration of a stage 1 simulation of a deformable element in accordance with the invention.

FIG. 3 shows by way of example and schematically a deformable element in a simulation, stage 1. A deformable element 1 is shown in a grid line display of a computer simulation. The deformable element 1 is formed similarly to the deformable element 1 shown in FIGS. 1 and 2 and has a substantially square profiled tube 2, a plate 3 and a bracket 4. To clarify the deformation sequence, the collision object is not shown, such an opponent is assumed to be non-deformable in FIGS. 3 to 8 and has a flat structure, in other words strikes in a two-dimensional manner and axially in the direction of the longitudinal axis of the deformable element. FIG. 1 shows the non-deformed state prior to striking an object.

Figure 4:
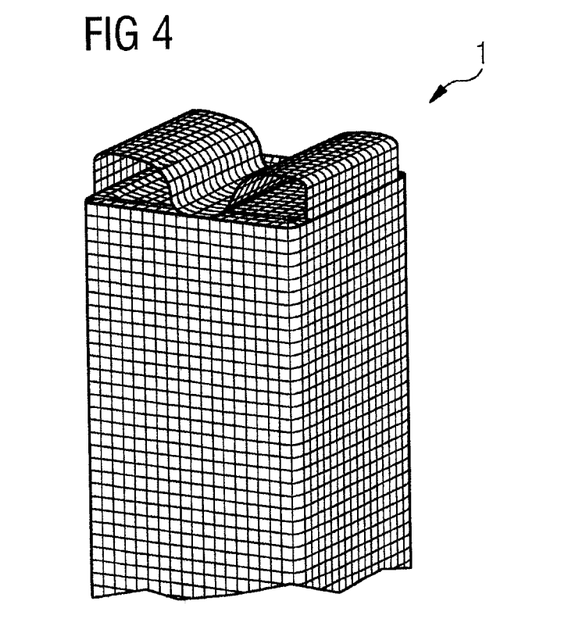
FIG. 4 is an illustration of a stage 2 simulation of the deformable element in accordance with the invention.

FIG. 4 shows by way of example and schematically a deformable element in a simulation, stage 2. The start of the deformation is shown immediately after the collision object has struck. The peak of the concave section of the bracket 4 touches the plate 3 and begins to impress the same.

Figure 5:
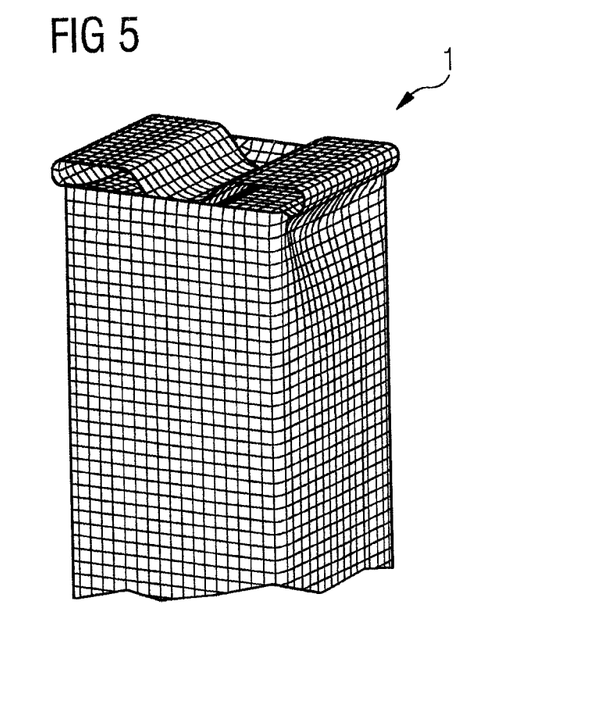
FIG. 5 is an illustration of a stage 3 simulation of the deformable element in accordance with the invention.

FIG. 5 shows by way of example and schematically a deformable element in a simulation, stage 3. The bracket 4 has already impressed the plate 3 lower and the two sides of the profiled tube 2, to which the bracket 4 is fastened, are bulged outwards by the deformation of the bracket 4. The two further opposite sides of the profiled tube 2 are inwardly curved by the deformed plate 3. On account of this initial deformation, a deformation path that corresponds to the natural bulge pattern that otherwise largely omits the required force peak can be initiated.

Figure 6:
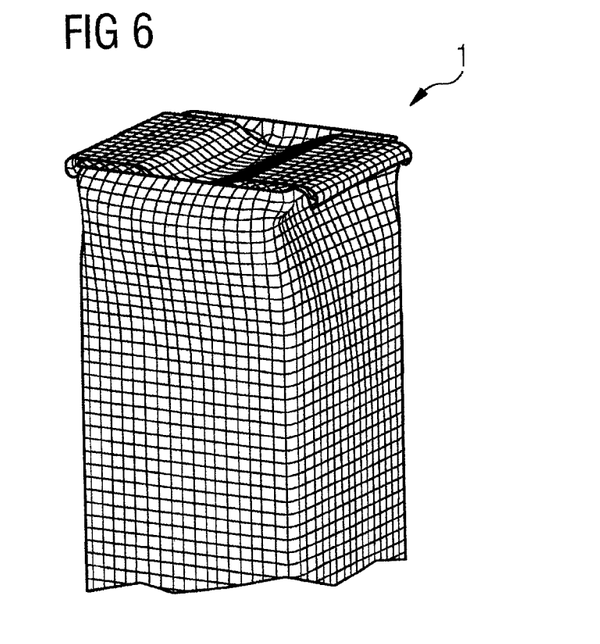
FIG. 6 is an illustration of a stage 4 simulation of the deformable element in accordance with the invention.

FIG. 6 shows by way of example and schematically a deformable element in a simulation, stage 4. The bracket 4 is already flattened, the exclusive progressive folding of the profiled tube 2 follows.

Figure 7:
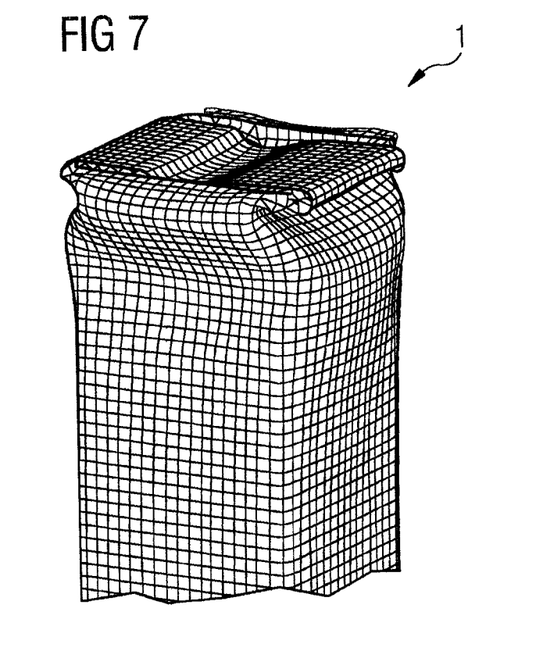
FIG. 7 is an illustration of a stage 5 simulation of the deformable element in accordance with the invention.

FIG. 7 shows by way of example and schematically a deformable element in a simulation, stage 5. The deformation path occurs exclusively in the profiled tube 2. The bracket 4 no longer takes part in any further deformation.

Figure 8:
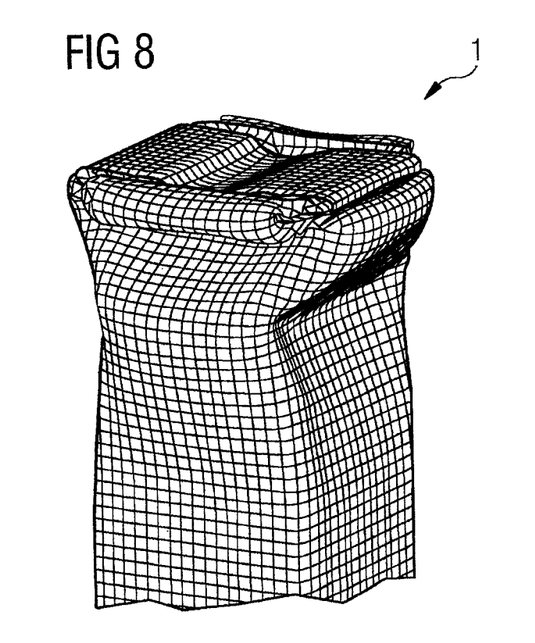
FIG. 8 is an illustration of a stage 6 simulation of the deformable element in accordance with the invention.

FIG. 8 shows by way of example and schematically a deformable element in a simulation, stage 6. Further along the deformation path, the sides walls of the profiled tube 2 already have two folds each.

Figure 9:
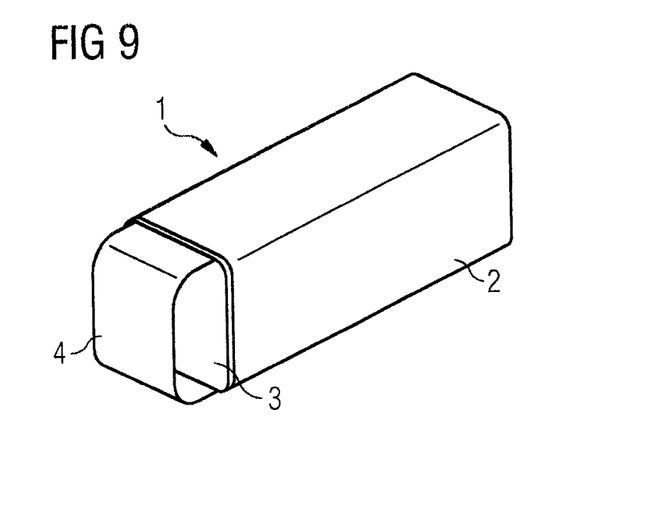
FIG. 9 is an illustration of a deformable U-shaped bracket of the deformable element of FIG. 1.

FIG. 9 shows by way of example and schematically a deformable element with a U-shaped bracket. That is, a deformable element 1 with a U-shaped bracket 4 is shown. The further components, such as the hollow tube 2 and the plate 3, correspond to the exemplary embodiment shown in FIG. 1.

Figure 10:
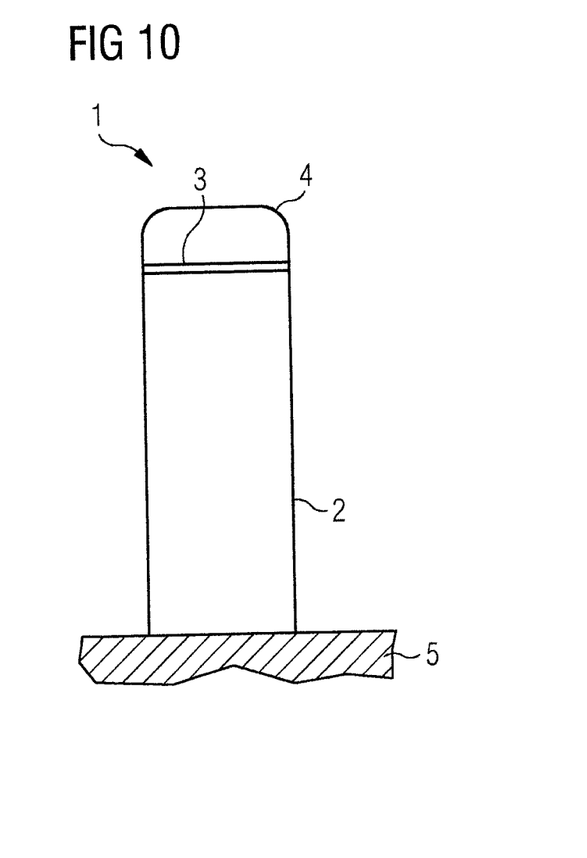
FIG. 10 is an illustration of a side view of the deformable U-shaped bracket of FIG. 9.

FIG. 10 shows by way of example and schematically a deformable element with a U-shaped bracket in a side view. Here, the deformable element 1 from FIG. 9 is shown in a side view in which the U-shape of the bracket 4 is especially clear. Moreover, a support component 5 is shown, to which the deformable element 1 is fastened.

Figure 11:
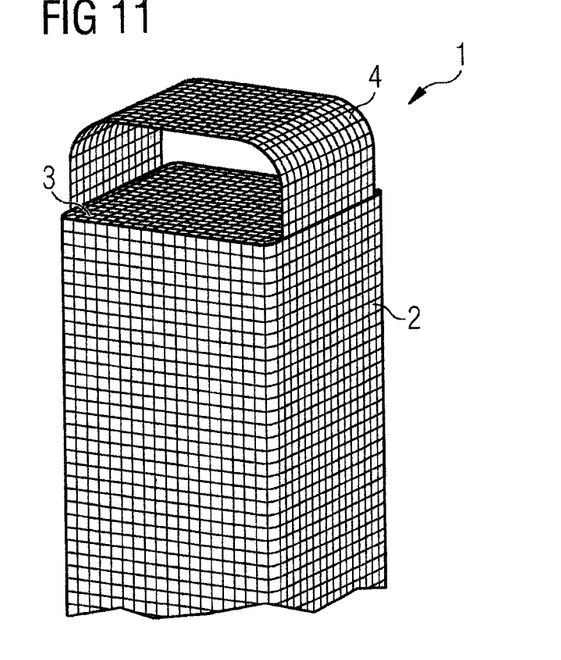
FIG. 11 is an illustration of stage 1 simulation of the deformable element U-shaped bracket in accordance with the invention.

FIG. 11 shows by way of example and schematically a deformable element in a simulation, stage 1. A deformable element 1 is shown in a grid line display of a computer simulation. The deformable element 1 is formed similarly to the deformable element 1 shown in FIGS. 9 and 10 and has a substantially square profiled tube 2, a plate 3 and a U-shaped bracket 4. To clarify the deformation sequence, the collision object is not shown, such an object is assumed to be non-deformable in FIGS. 9 to 10 and has a flat structure, in other words strikes in a two-dimensional manner and axially in the direction of the longitudinal axis of the deformable element. FIG. 1 shows the non-deformed state prior to striking the object.

Figure 12:
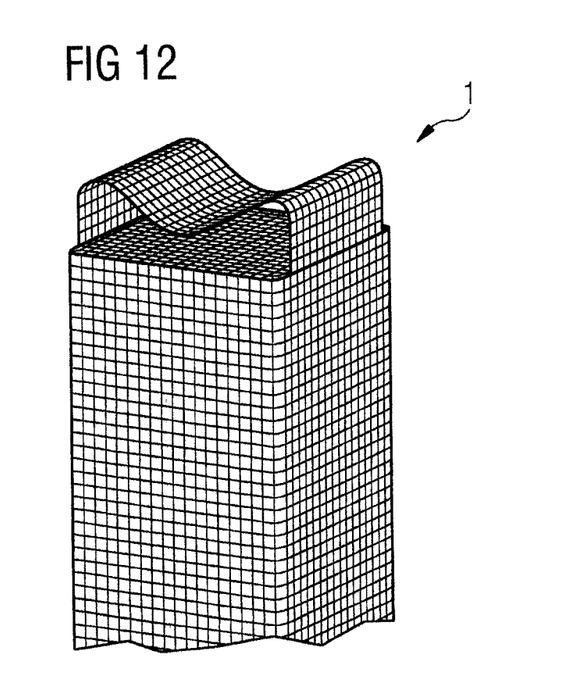
FIG. 12 is an illustration of stage 2 simulation of the deformable element U-shaped bracket in accordance with the invention.

FIG. 12 shows by way of example and schematically a deformable element in a simulation, stage 2. The deformable element from FIG. 11 is shown in the next stage of the deformation path. Here, the U-shaped bracket 4 is deformed by striking the collision object such that it has a double s-shaped path. The further deformation path follows the path shown in FIGS. 4 to 8 with a double s-shaped bracket. It is thus possible to dispense with a display of an equivalent path.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A water-tight deformable element, comprising:
   a profiled tube having a rectangular cross-section;
   a continuously planar plate which closes the profiled tube at a first end of the tube; and
   a bracket formed to match the rectangular cross-section of the profiled tube and having a repeatedly curved shape which is formed in a double s-shape, said bracket being axially aligned with the profiled tube and the continuously planar plate, oriented away from the profiled tube and directly fastened to and terminating at the first end of the profiled tube which is closed by the continuously formed planar plate to form the water-tight deformable element.

2. The deformable element as claimed in claim 1, wherein the profiled tube, the plate and the bracket are each welded together.

3. The deformable element as claimed in claim 2, wherein the profiled tube is configured to fasten to a support component at a second end of the profiled tube facing away from the bracket.

4. The deformable element as claimed in claim 1, wherein the profiled tube is configured to fasten to a support component at a second end of the profiled tube facing away from the bracket.

5. The deformable element as claimed in claim 4, wherein the profiled tube is formed to produce a welding connection with the support component.

6. The deformable element as claimed in claim 4, wherein the profiled tube is formed to produce a screw connection with the support component.

7. The deformable element as claimed in claim 1, wherein the bracket is manufactured from sheet metal and follows an essentially U-shaped course between fastening points on the profiled tube.

8. The deformable element as claimed in claim 1, wherein the bracket is manufactured from sheet metal and follows a form between fastening points on the profiled tube which has a convex section, followed by a concave section, followed by a convex section.

9. The deformable element as claimed in claim 8, wherein a peak of the concave section is set at a distance from the plate.

* * * * *